UNITED STATES PATENT OFFICE 2,364,348

SURFACE-ACTIVE AGENTS

Joseph B. Dickey, Rochester, N. Y., assignor to Eastman Kodak Company, Rochester, N. Y., a corporation of New Jersey No Drawing. Application July 24, 1941,
Serial No. 403,879

4 Claims. (Cl. 260—500)

This invention relates to the preparation of a new class of chemical compounds useful for a wide variety of purposes, especially as surface-active agents, wetting, dispersing, emulsifying and anti-static agents and as textile assistants. The invention relates more particularly to the preparation of certain phosphinic acids of ketones containing one or more naphthenyl groups and salts of such ketones.

This application is a continuation-in-part of my copending application, Serial No. 357,291, filed September 18, 1940, now U. S. Patent 2,256,112.

I have found that compounds useful for the above-indicated purposes may be prepared when compounds having the general formula

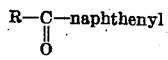

wherein R is a substituent selected from the group consisting of hydrogen, alkyl, aryl, heterocyclic, cycloalkyl and naphthenyl groups are treated with hypophosphorous acid to give compounds having the formula:

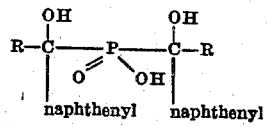

wherein R has the meaning referred to above.

If the reaction is stopped at the intermediate stage

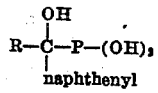

mixed acids can be formed by treating with a different aldehydic or ketonic compound. These mixed acids may be represented by the formula:

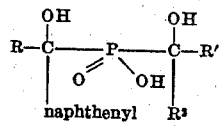

wherein R has the meaning referred to above, R' and R² are similar to R and wherein R' and R² may be part of the same system of cyclic carbon atoms. Products of the type illustrated by this formula are obtained by reaction compounds of the type illustrated by the structural formula

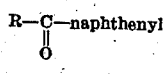

with hypophosphorous acid and then with compounds illustrated by the structural formula

PREPARATION OF ACIDS

Intermediates required for the preparation of the new phosphinic acids of ketones of my invention are described in the copending application of J. B. Dickey and J. G. McNally Ser. No. 320,718, filed February 24, 1940, in U. S. Patents 1,988,021 and 1,989,325 and in Lewkowitsch, "Chem. Technology of Oils, Fats, and Waxes," 6th edition, 1, p. 146–155. By the term naphthenyl we refer to radicals of the general class described in chapter 48 of "The Chemistry of Petroleum Derivatives" by Carleton Ellis.

Typical examples of the preparation of this type of compound are given below:

Example 1

3 moles of phenylnaphthenyl ketone are heated with 66 g. of hypophosphorous acid for one day or more at a temperature of 60–100°. Upon cooling product having the formula:

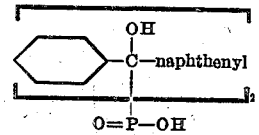

(Bis-phenylnaphthenyl hydroxy methane phosphinic acid)

crystallizes out. There is also formed some

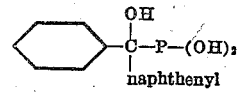

which is quickly oxidized to

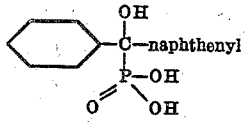

Example 1A 3 moles of xylyl naphthenyl ketone are heated with 66 g. of hypophosphorous acid for one day or more at a temperature of 60–100°. Upon cooling a product having the formula:

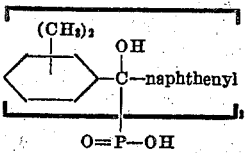

₂Bis-phenylnaphthenyl hydroxy methane phosphinic acid)

crystallizes out. There is also formed some

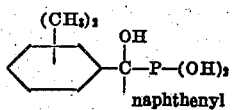

which is quickly oxidized to

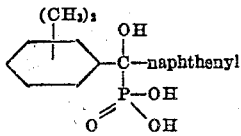

Example 2

2.5 gram moles methylnaphthenyl ketone are reacted with 66 g. of hypophosphorous acid as in Example 1. The product has the formula:

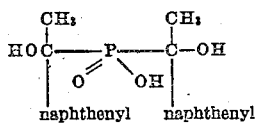

(Bis-alpha-naphthenyl-alpha-hydroxy ethane phosphinic acid)

Example 3

One gram mole of dinaphthenyl ketone is reacted with 66 g. of hypophosphorous acid as in Example 1 and the intermediate product thus formed is heated as before with two moles of methylamyl ketone. The product has the formula:

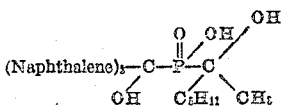

(Di-naphthenyl hydroxy methane-beta-hydroxy heptane phosphinic acid)

The compounds listed below represent in general the products of this invention prepared by the technique described above.

(A)

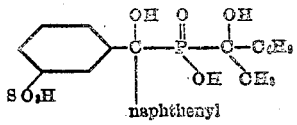

(Meta-sulfo phenyl naphthenyl hydroxy methane-beta-hydroxy hexane phosphinic acid)

(B)

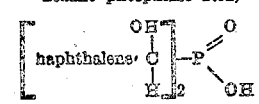

(Bis-naphthenyl hydroxy methane phosphinic acid)

(C)

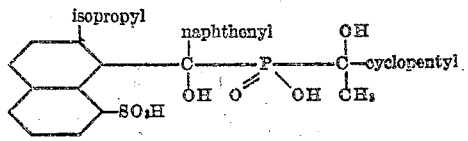

(2-isopropyl-8-sulfo-1-naphthyl naphthenyl hydroxy methane-alpha-hydroxy-alpha-cyclopentyl ethane phosphinic acid)

(D)

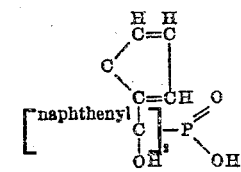

(Bis-furyl naphthenyl hydroxy methane phosphinic acid)

(E)

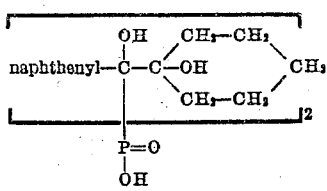

(Bis-naphthenyl hydroxy cyclohexane hydroxy methane phosphinic acid)

(F)

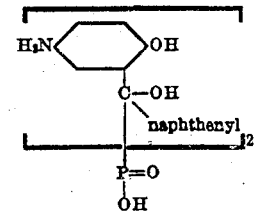

(Bis-2-hydroxy-5-amino phenyl naphthenyl hydroxy-methane phosphinic acid)

(G)

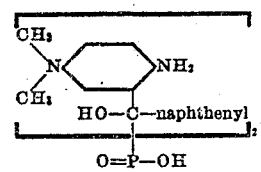

(Bis-2-amino-5-dimethyl amino phenyl naphthenyl hydroxy methane phosphinic acid)

Example 3A 3 moles of naphthenyl aldehyde, prepared by treating naphthenic acid chloride with hydrogen over palladiumized barium sulfate, is treated with 66 g. of hypophosphorous acid for 1 day at 60–100°. Upon cooling a product having the formula

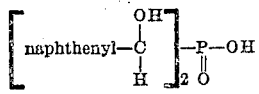

was obtained.

Using naphthenyl aldehyde and other ketone aldehydes the following may be prepared.

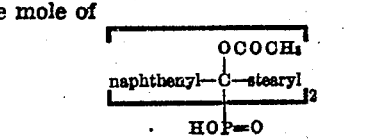

PREPARATION OF SALTS

Example 4

One mole of

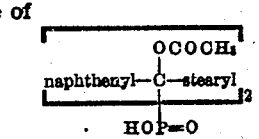

is treated in water with 1 mole potassium hydroxide. The product, potassium bis-naphthenyl acetoxy stearyl methane phosphonic acid salt, is slightly soluble in hot water. In place of potassium I may prepare the sodium, ammonium, calcium, barium, magnesium, etc., salts.

*Example 5*

One mole of

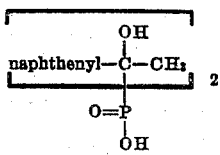

is reacted with triethanolamine in the dry state or in any suitable solvent. The salt formed is bis-alpha-naphthenyl-alpha-hydroxy-ethane phosphinic acid triethanolamine salt. In place of triethanolamine I may use ethanolamine, diethanolamine, glycerolamine, mono-, di-, or tributylamine, cyclohexylamine, diethylcyclohexylamine, tetrahydrofurfurylamine, ditetrahydrofurfurylamine, di-beta-alkoxy-ethylamine, morpholine, ethylenediamine, tetramethylammonium hydroxide, etc.

The compounds of my invention are useful as surface-active compounds and as such may be employed as wetting agents, emulsifying and dispersing agents, textile assistants, dye-dispersing agents and anti-statics as more fully set forth in my above-mentioned U. S. Patent 2,256,112.

What I claim is:

1. As new chemical compounds phosphinic acids of ketones having the general formula:

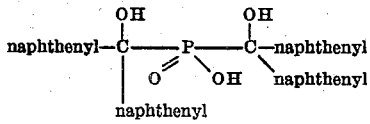

2. As new chemical compounds phosphinic acids of ketones having the general formula:

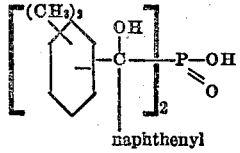

3. As new chemical compounds phosphinic acids of ketones having the general formula:

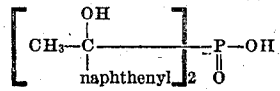

4. As new chemical compounds phosphinic acids of naphthenyl ketones having the general formula:

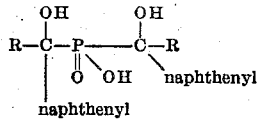

wherein R is a radical composed of carbon and hydrogen selected from thce group of radicals consisting of alkyl, aryl, cycloalkyl and naphthenyl.

JOSEPH B. DICKEY.